(12) United States Patent
White et al.

(10) Patent No.: US 9,380,079 B2
(45) Date of Patent: Jun. 28, 2016

(54) CONTENT MULTICASTING

(75) Inventors: Greg White, Louisville, CO (US);
Garey L. Hassler, Castle Rock, CO (US); Douglas M. Young, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1036 days.

(21) Appl. No.: 13/536,204

(22) Filed: Jun. 28, 2012

(65) Prior Publication Data

US 2013/0007226 A1  Jan. 3, 2013

Related U.S. Application Data

(60) Provisional application No. 61/502,408, filed on Jun. 29, 2011.

(51) Int. Cl.
| | |
|---|---|
| G06F 15/16 | (2006.01) |
| H04L 29/06 | (2006.01) |
| H04N 21/438 | (2011.01) |
| H04N 21/6405 | (2011.01) |
| H04L 12/18 | (2006.01) |

(52) U.S. Cl.
CPC .......... *H04L 65/1059* (2013.01); *H04L 12/185* (2013.01); *H04L 65/4076* (2013.01); *H04L 65/80* (2013.01); *H04N 21/4383* (2013.01); *H04N 21/6405* (2013.01)

(58) Field of Classification Search
CPC ... H04L 65/4076; H04L 65/80; H04L 12/185; H04L 65/1059; H04N 21/4383; H04N 21/6405
USPC ................................................. 709/200, 219
See application file for complete search history.

(56) References Cited

U.S. PATENT DOCUMENTS

| | | | | |
|---|---|---|---|---|
| 7,366,780 B2* | 4/2008 | Keller | ..................... | H04L 29/06 370/260 |
| 7,545,825 B2* | 6/2009 | Zhu | ........................ | H04L 12/189 370/312 |
| 8,098,670 B2* | 1/2012 | Okazaki | .................. | H04L 12/14 370/401 |
| 8,392,593 B1* | 3/2013 | Wadhwa | ................. | H04L 47/15 370/390 |
| 8,516,529 B2* | 8/2013 | Lajoie | ................. | H04L 65/1016 709/201 |
| 2004/0264463 A1* | 12/2004 | Fukushima | ........... | H04L 12/184 370/390 |
| 2006/0120368 A1* | 6/2006 | Aboukarr | .............. | H04L 12/185 370/390 |
| 2008/0098420 A1* | 4/2008 | Khivesara | .............. | G06Q 30/02 725/32 |
| 2008/0320501 A1* | 12/2008 | Li | ....................... | G06F 9/45537 719/324 |
| 2009/0003342 A1* | 1/2009 | Dickens | ................ | H04L 12/185 370/390 |
| 2009/0022154 A1* | 1/2009 | Kiribe | .................... | H04L 12/185 370/390 |
| 2009/0190474 A1* | 7/2009 | Gahm | .................... | G06F 9/5011 370/235 |
| 2009/0276224 A1* | 11/2009 | Medina | .............. | H04N 7/17336 704/275 |
| 2010/0115566 A1* | 5/2010 | Haimi-Cohen | .... | H04N 7/17318 725/94 |

(Continued)

*Primary Examiner* — Anthony Mejia
(74) *Attorney, Agent, or Firm* — Great Lakes Intellectual Property, PLLC

(57) ABSTRACT

A multicast system is contemplated. The multicast system may be configured to facilitate changing between multicast steams by caching one multicast stream while tuned to another multicast stream in anticipation of tuning to the cached multicast stream. Attributes associated with available multicast streams may be communicated to assist accessing devices in deciding which one or more of the available multicast streams to cache.

17 Claims, 4 Drawing Sheets

(56) References Cited

U.S. PATENT DOCUMENTS

| | | | |
|---|---|---|---|
| 2010/0238924 A1* | 9/2010 | Liu | G06Q 10/087 370/390 |
| 2010/0313228 A1* | 12/2010 | Morrissey | H04N 7/17318 725/97 |
| 2011/0202965 A1* | 8/2011 | Henry | G04N 7/17318 725/110 |
| 2011/0219412 A1* | 9/2011 | Cooper | H04N 7/173 725/109 |
| 2011/0228769 A1* | 9/2011 | Haimi-Cohen | H04L 12/18 370/390 |
| 2011/0252156 A1* | 10/2011 | Basso | H04L 65/605 709/231 |
| 2011/0289544 A1* | 11/2011 | Goosen | H04N 21/4384 725/116 |
| 2012/0166796 A1* | 6/2012 | Metke | H04L 9/321 713/158 |
| 2012/0243537 A1* | 9/2012 | Salinger | H04L 12/185 370/390 |

\* cited by examiner

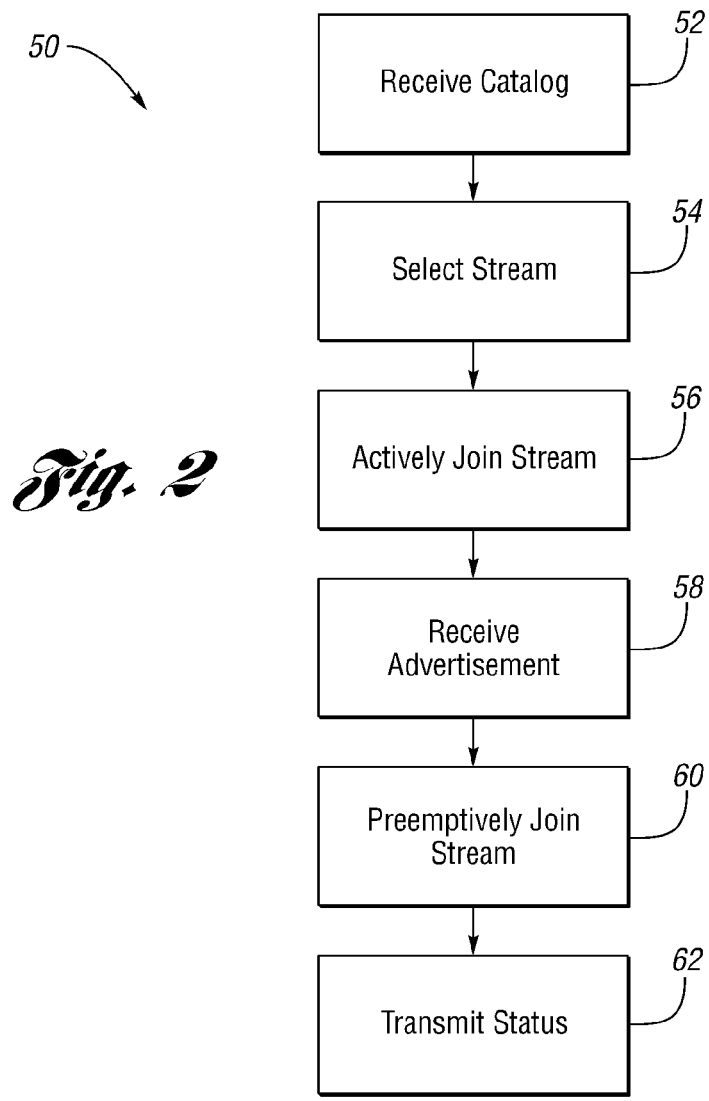
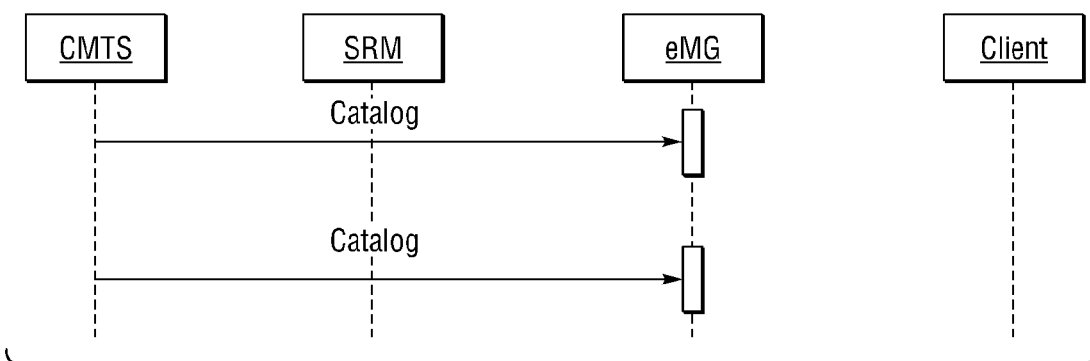

CONTENT MULTICASTING

CROSS-REFERENCE TO RELATED APPLICATIONS

This application claims the benefit of U.S. provisional Application No. 61/502,408 filed Jun. 29, 2011, the disclosure of which is incorporated in its entirety by reference herein.

TECHNICAL FIELD

The present invention relates to multicasting content, including but not necessarily limited to multicasting linear content on-demand over Internet Protocol (IP).

BACKGROUND

A multicast stream corresponds with transmission of content to two or more devices. A multicast transmission may be characterized as a one-to-many transmission whereby two or more devices desiring access to a multicast stream may commonly access a port or frequency associated with a sourcing device. Some systems may be configured to facilitate on-demand transmission of multicast streams such that multicast streams are constructed and deconstructed according to a number of accessing devices. In particular, such systems may be configured to construct multicast streams only when requested by at least one device and to deconstruct any multicast stream which is not actively being accessed by at least one device. The multicast streams may be configured to facilitate transmission of various types of content, including video, audio and data. In some cases the content may be linear content, such as but not necessarily limited to that sourced from a continuous stream of signaling, which may be carried over Internet protocol (IP). The IP-based transmission may allow the multicast streams to be packetized for delivery over the Internet or other data network.

BRIEF DESCRIPTION OF THE DRAWINGS

FIG. 2 illustrates a flowchart of a method of facilitating a channel change as contemplated by one non-limiting aspect of the present invention.

FIG. 5 illustrates a sequence diagram for a catalog message as contemplated by one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
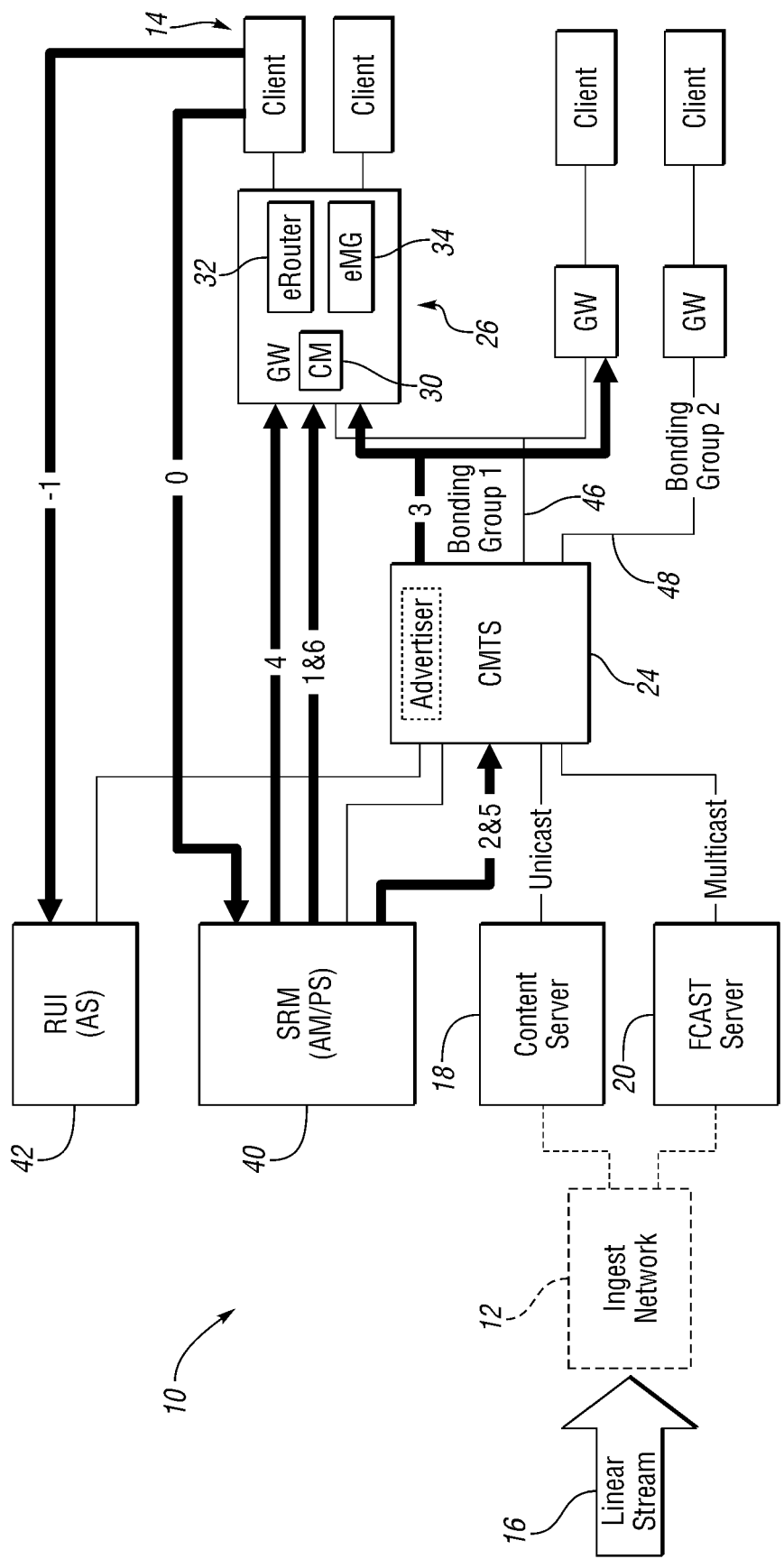
FIG. 1 illustrates a multicast system as contemplated by one non-limiting aspect of the present invention.

FIG. 1 illustrates a multicast system 10 as contemplated by one non-limiting aspect of the present invention. The system 10 may be configured to facilitate transmission of content from an ingest network 12 to one or more clients 14. The ingest network 12 may be associated with any type of network having capabilities sufficient to facilitate receiving content for subsequent transmission. The present invention is predominately described with respect to the ingest network 12 being associated with the television service provider, such as but not necessarily limited to a cable television service provider, a satellite television service provider, broadcast television service provider, a multiple system operator (MSO), a voice over Internet protocol (VoIP) service provider, an Internet service provider (ISP) and other types of entities having capabilities sufficient to facilitate providing services or other electronic signaling dependent applications. The present invention is described with respect to the ingest network 12 being associated with receiving television signaling and the subsequent delivery of television related signaling to one or more of the clients 14. This is done for exemplary non-limiting purposes as the present invention fully contemplates its use and application with other types of signal transmission.

The ingest network 12 is shown to receive a linear stream 16. The linear stream 16 may be associated with a plurality of television programs being broadcasted in real-time from a sourcing entity (not shown), such as but not limited to a studio, a broadcast station, a website, etc. The linear stream 16 may be received in any format, including receipt through IP or a direct connection via satellite, broadcast, or packet network. The linear stream 16 may be contrasted with non-linear streams in that the linear streams, such as but not necessarily limited to those associated with video-on-demand (VOD), are being continuously received by the ingest network as opposed to the non-linear streams that are constructed upon request from a client or other output device. While not shown, the system 10 may include a headend unit or other device to receive additional linear streams and/or the same linear stream for transmission over a cable, satellite, broadcast infrastructure to a set top box (STB) or other client device (not shown), which may be configured to tune to a quadrature amplitude modulated (QAM) channel carrying a corresponding portion of the linear stream. The STB may be configured to tune to one or more channels depending on a number of included tuners such that is able to output a corresponding number of television streams to a television or other client for viewing and/or storage.

The linear stream 16 may be separated or copied by the ingest network for subsequent transmission to a content server 18 and a multicast server 20. A cable modem termination system (CMTS) or other sourcing device 24 may be configured to receive streams output from the content server 18 or the multicast server for delivery to a plurality of gateways 26 (GW) associated with the clients 14. The content server 18 may be configured to facilitate unicast delivery of the linear content on a one-to-one basis such that a dedicated signaling path occurs between the content server 18 and the gateway/client 14, 26. The multicast server 20 may be configured to facilitate multicast transmission of the linear content within multicast streams. The multicasting may be transmitted on a one-to-many basis such that multiple gateways/clients 14, 26 may be able to simultaneously receive the same multicast streams. The present invention is illustrated as relying on the gateways 26 to process signals received from the sourcing device 24 prior to facilitating output to the client 14. The present invention, however, fully contemplates elimination of the gateway 26 and/or integration of the gateway 26 with the clients 14 such that the processes described herein with respect to the gateway 26 and/or the client 14 may occur interchangeably with either one or both of the gateways 26 and clients 14.

The gateways 26 are shown to include a cable modem 30, an embedded router (eRouter) 32 and an embedded multimedia gateway (eMG) 34. The cable modem 30 may be configured to facilitate IP-based data signaling with the sourcing device 24, such as according to the Data Over Cable Service Interface Specification (DOCSIS), the disclosure of which is hereby incorporated by reference in its entirety. The eRouter 32 may be configured to facilitate general IP related signaling associated with data exchanges between the sourcing device 24 and the clients 16, such as over a wireless or wireline networks ported within a home associated with the gateway 26. The eRouter 32 may be configured in accordance with Data-Over-Cable Service Interface Specifications, IPv4 and IPv6 eRouter Specification, CM-SP-eRouter-I08-120329, the disclosure of which is hereby incorporated by reference in its entirety. The eMG 34 may be configured to facilitate multicast signaling between the sourcing device 24 and the clients 14, i.e. video related signaling not facilitated through the eRouter or that is otherwise unknown to the router. The eMG 34 may optionally be configured to support signaling over a wireless or wireline connection with the clients 14. The unicast/multicast signaling facilitated with the eMG 34 may be differentiated from the data signaling facilitated with the eRouter 32. The eMG 34 may be contrasted with a tuner included within and STB in that the eMG 34 is able to obtain multiple television channels/programs at the same time through a single interface, i.e., the cable modem 30, as long as the television channel/programs are within the same multicast service group whereas the STB is limited to accessing only one television channel/program per tuner and it is also not able to receive the corresponding signaling as IP signaling. While the eRouter 32, eMG 34 and cable modem 30 are shown to be separate components, the present invention is not necessarily so limited and fully contemplates one or more of the functions associated therewith being integrated within a common component or otherwise having another type of configuration.

A session resource manager (SRM) 40 may be included to facilitate transmission of unicast and multicast streams from the sourcing device 24 according to the contemplation of the present invention. The present invention is predominately described with respect to the SRM 40 and its cooperation in facilitating transmission of multicast streams from the sourcing device 24 to the clients 14 as the present invention particularly contemplates use of the SRM 40 to facilitate construction and deconstruction of multicast streams. The contemplated construction and deconstruction of multicast streams may be differentiated from unicast streams in that the unicast streams are inherently necessarily constructed and deconstructed on a one-to-one basis depending on whether the originating communication points, e.g., the sourcing device 24 and the client 14, are actively relying on the corresponding unicast stream. The multicast stream may be communicated on a one-to-many basis such that the management of stream construction and deconstruction may be more involved or complicated than that which would be required to facilitate managing unicast streams. This is done, however, without unnecessarily limiting the scope and contemplation of the present invention as the present invention fully contemplates its use and application in the management of various content streams.

The multicast streams managed in accordance with the present invention may be considered to be on-demand streams in that they are constructed and deconstructed according to whether one or more client devices 14 are requesting access. This may be differentiated from a switched video platform or other platform where a portion of the content streams are carried at all times regardless of whether any one or more clients 14 are accessing content streams. The multicast streams made available to the client 14 may be facilitated with use of a user interface operable on the client 14 and/or gateway 26. A remote user interface (RUI) 42 may be included to facilitate providing applications, software and other features sufficient to facilitate display of a user interface, such as but not necessarily limited to the user interface described within U.S. patent application Ser. No. 13/458,276, the disclosure of which is hereby incorporated by reference in its entirety. The user interface may be presented at the client 14 where a user may select one or more multicast streams for access and/or through which the user may input instructions or other parameters, such as preferences, genres, service subscriptions, etc., regarding multicast streams desired for access.

The SRM 40 may be configured to determine requests from the clients 14 or other entities for constructing one or more multicast streams according to interaction with one of the user interfaces. The multicast streams may be made available from the sourcing device 24 through a port or at a particular frequency. The gateway 26 associated with the client 14 desiring the multicast stream may be provided an address, such as but not necessary limited to an IPv4 or IPv6 group address, at which the corresponding multicast stream may be received from the sourcing device. The gateway 26, or more particularly the eMG 34, may be configured to connect to the corresponding port or to listen for signals carried at the responding frequency in order to access the multicast stream. The multicast stream may be made available to multiple gateways 26. Each gateway 26 having access to the same multicast streams may be considered to be within a multicast service group. FIG. 1 illustrates a first multicast group 46 and a second multicast service group 48. The first and second multicast service groups 46, 48 correspond with gateway combinations that connect to different ports or read different frequencies of the sourcing device, which is illustrated with a separate first and second connection points.

The multicast service groups 46, 48 may be determined by the sourcing device 24. The boundaries between multicast service groups 46, 48 may be determined depending geographical requirements, network requirements and other parameters that may influence the capability of certain gateways to access particular multicast streams, e.g., attenuation, delay or other signaling influences may dictate whether a gateway 26 is able to maintain a certain quality of service necessary to facilitate desired access to the multicast streams. The ingest network 12 may be configured to provide any number of content pieces or groupings to the sourcing device 24 for subsequent transmission to the clients 14. The SRM 40 may be configured to facilitate transmission of a catalog from the sourcing device 24. The catalog may be used to identify each of the multicast streams available from the sourcing device 24, i.e., each multicast stream that may be associated with a particular piece of content made available to the sourcing device 24 for transmission. The multicast streams identified within the catalog may comprise a totality of linear content available from the sourcing device 24, which may be requested by any one of the clients 14 of either one of the service groups 46, 48.

The SRM 40 may be configured to facilitate transmission of an advertisement from the sourcing device 24 to the gateways 26 and/or clients 14. Separate or independent advertisements may be transmitted to identify active multicast streams available to a particular one or more of the gateways 26. The advertisements may be broken down according to multicast service groups 46, 48 such that advertisements are delivered on a multicast service group by multicast service group basis to identify multicast streams currently being made available by the sourcing device 24 to the corresponding gateways 26. One non-limiting aspect the present invention contemplates the sourcing device 24 having at least two multicast service groups 46, 48 where one of the service groups may be supporting less multicast streams than the total number of multicast streams identified to be available within the catalog. In this manner, the advertisement may identify a selected portion of the multicast streams noted within the catalog that are currently being accessed by at least one or more gateways 26 associated with the same source group 46, 48. The catalog, in contrast, may identify multicast streams which are available to the clients 14 but which are not limited to those currently being accessed by at least one client 14.

The advertisements may be dynamically updated by the SRM 40 according to construction and deconstruction of the multicast streams such that new advertisements may be provided to relevant gateways 26 in order to identify multicast streams that are currently active. Optionally, transmissions of new advertisements may be triggered by construction or deconstruction of multicast streams such that new advertisements are transmitted each time multicast streams are added or removed. This may be useful in continuously apprising the gateways 26 of currently available multicast streams in order to prevent the gateways 26 from requesting access to deconstructed multicast streams, i.e., rather than attempting to access content associated with a deconstructed multicast stream, the gateway 26 may be required to request construction of a new multicast stream for the same content. The gateways 26 and/or clients 14 may be configured to provide status messages to the SRM 40 for use in assessing whether the multicast streams are still being used. The use of the multicast streams may optionally be characterized as one of active and preemptive depending on whether one or more gateways 26 are tuning to the multicast streams or caching the multicast streams.

The active multicast streams may correspond with those which are actively being output from the gateway 26 to at least one client. This may include the eMG 34 tuning to the corresponding multicast stream and processing information included therein for output to the client 14, e.g., tuning to a particular television channel for output to a television. The active multicast streams may correspond with those which have been actively joined with user selection through the user interface for immediate viewing. The preemptive multicast streams may correspond with those which are being cached by the gateway 26. The caching may be achieved by the eMG 34 temporarily storing the most recent portion of the multicast stream, e.g., the last 4-8 seconds. The eMG 34 may be configured to cache a plurality of multicast streams so that in the event a user desires to switch to one of the cached multicast streams it can be tuned to for output to the client without delay, i.e., without having to request the SRM 40 to construct new multicast stream and/or prior to tuning away from the currently access multicast stream. Optionally, prior to extinguishing the cached portion of the cached multicast room, the eMG 34 may be configured to actively join the corresponding multicast stream in order to insure continuous output to the client 14.

The caching or preemptive joining of the multicast streams may be differentiated from the active joining at least in that the corresponding content is not contemporaneously being output to the client for viewing. Optionally, the preemptively joined multicasting may be distinguished from the actively joined multicast streams based on an intended use of the corresponding content e.g., in the event the intended use is for actual viewing or consumption then the multicast stream may be considered to be actively joined whereas if the intended use is for an expected channel change or other expected usage then the multicasting may be considered to be preemptively joined. The ability to preemptively joined multicast streams prior to actively joining the multicast stream may be beneficial in allowing the eMG 34 to more quickly begin outputting content than it otherwise would. The ability to preemptively joined multicast streams may also be beneficial in eliminating creation of a unicast transmission that may otherwise be used to provide the last 4-8 seconds of content for a changed-to multicast stream (some latencies may require the last 4-8 seconds of content in order to begin immediate playback of the content).

The advertisement provided to the gateways 26 may be used to facilitate the gateway's decision-making with respect to the multicast streams preemptively joined by each of the gateways. Since the gateway 26 may not be able to preemptively join each of the multicast streams delivered to its multicast service group, i.e., it may receive all the multicast but it may be configured to cache a limited portion of those that are received, attributes and other information included within the advertisement may be used to select the more desirable ones of the multicast streams for preemption. The preemptive joining may include the gateway 26 assessing the multicast streams available within its multicast service, such as according to popularity, whether the content relates to a premium for non-premium television channel, genre, and other preference related attributes. The attributes identified within the advertisement may be compared to a list of preferred attributes stored at the gateway 26 whereby the gateway automatically chooses to preemptively join the multicast streams having attributes with the highest matching or correlation with the user attributes associated with the gateway.

The ability of the present invention to continuously update the available multicast streams, and in particular the attributes associated with multicast streams, is believed to be particularly beneficial in facilitating multicast stream channel changing since it allows the gateways 26 to preemptively join multicast streams without requiring user input and/or without fixing the multicast streams to be preemptively joined by the gateways 26. In this manner, each gateway 26 may dynamically vary the multicast streams that it preemptively joins according to the particular user's preferences and/or the attributes of the currently available the multicast streams. In this manner, the present invention contemplates anticipating future channel changes or other changes in operation of the gateway 26 for which content from the preemptively joined multicasting may be beneficial in facilitating the desired operation. Of course, the present invention is not necessarily so limited and fully contemplates requiring one or more of the gateways 26 to preemptively join a fixed or pre-defined number of multicast streams, optionally in cooperation with dynamically facilitating preemptively joining multicast streams having desirable attributes.

FIG. 2 illustrates a flowchart 50 of method of facilitating a channel change as contemplated by one non-limiting aspect of the present invention. The method is described with respect to facilitating changing multicast streams from an actively joined stream to a preemptively joined stream. This description, however, is provided for exemplary purposes and is not necessarily intended to limit the scope contemplation the present invention. The method is described with respect to a gateway, a client or other device processing multicast streams for output having a non-transitory computer-readable medium with computer-readable code embodied therein for controlling a computing device to electronically facilitate changing multicast channels where the computer-readable code includes instructions sufficient for facilitating operations described herein. The method is described with respect to the gateway, however, the present invention fully contemplates the SRM, the sourcing device or other elements associated with the system having similar computing capabilities and/or computer-readable mediums sufficient to facilitate directing the gateway or other devices in the system to facilitate the contemplated operations.

Block 52 relates to receiving a catalog of multicast streams that identifies a totality of multicast streams available on-demand. A gateway may receive the catalog from the SRM, the sourcing device or other element of the system. The catalog may be communicated in a catalog message or other suitable conveyance to a plurality of gateways such that each gateway, or at least a number of the gateways within a related geographical area, receives the same catalog. Block 54 relates to selecting one of the multicast streams listed in the catalog or otherwise noted as being available for tuning. The tuning may be characterized by a gateway processing a corresponding multicast stream for output to a client, which may optionally have been selected through corresponding user input with a user interface associated with a gateway. A user associated with the gateway may operate a tablet or other device to facilitate remotely controlling the gateway while at another location, such as in order to enforce parental control or to facilitate remote advertisement insertion during commercial breaks.

Block 56 relates to a gateway actively joining a multicast stream associated with the selected content. This may include the gateway requesting the SRM to construct a new multicast session or the gateway tuning to a previously constructed multicast session. A gateway may be configured to process multiple multicast streams such that at least one multicast stream is processed for output to the client and one or more multicast streams are cached or otherwise temporary stored for subsequent use. Block 58 relates to a gateway receiving an advertisement. The advertisement may identify each multicast stream constructed within a multicast service group associated with gateway. The multicast streams identified with an advertisement may comprise some number less than the totality of multicast streams listed within the catalog. This may result from currently constructed multicast streams having access limited to the gateways within the multicast service group. The advertising may be transmitted to the gateways within the multicast group instead of all the gateways receiving the catalog. The advertisement may include attributes and other characteristics of the constructed multicast streams that the gateway can process to determine whether one or more of the constructor multicast streams would be suitable for caching.

Block 60 relates to the gateway preemptively joining one or more of the multicast streams identified with an advertisement. The gateway may preemptively join the multicast streams by caching a portion of one or more the streams. The caching may be characterized by the gateway temporarily storing a portion of the multicast stream in anticipation of a channel change event or other activity resulting in a desire of the gateway to tune to the corresponding multicast stream for output to the client. The cached portion of the multicast streams may be quickly accessed by the gateway as part of the channel change to the corresponding multicast stream. This may be useful in improving channel change performance. The gateway may preemptively join multicast streams and unjoin preemptively joined multicast streams depending on the multicast streams currently being identified within advertisement. In particular, the gateway may preemptively join and unjoin multicast streams as multicast streams are added and removed from the advertisement, including unjoining preemptively joined multicast streams as new multicast streams having attributes more closely aligned with the desired attributes of the gateway are added.

Block 62 relates to a gateway transmitting a status message to the SRM, sourcing device or other entity tasked with managing or tracking active multicast streams. The status message may identify each multicasting stream actively or preemptively joined by the corresponding gateway. The SRM, for example, may rely on the status message to determine which one or more of the multicast streams are being actively joined and which one or more of the multicast streams are being preemptively joined. The SRM may be configured to command the sourcing device to maintain any actively joined multicast stream and to deconstruct any multicast stream that is only being preemptively joined. This may include cross-referencing the actively joined and preemptively joined multicast streams such that any multicast streams that are not also actively joined by at least one gateway are deconstructed. The SRM may be configured to update the advertisements for each multicast service to reflect any newly constructed or deconstructed multicast stream, including updating the advertisement upon receipt of status messages.

1.1 Protocol Messages
Message −1: Client↔RUIS: POST (client info); response (UI, URIs)
Message 0: Client↔SRM: join new program stream, leave old program stream (an alternative implementation is that this exchange happens via RUIS).
Message 1: SRM↔eMG: Add-Session for active client
Message 2: SRM↔CMTS: PCMM Gate-set (multicast group)
Message 3: Multicast CMTS→Bonding Group: periodic listing of FCASTs actively being routed to the bonding group
Message 4: eMG↔SRM: Session timeout, remove Session
Message 5: SRM↔CMTS: PCMM Gate-delete
Message 6: SRM↔eMG: remove Session for active client
1.2 Protocol Messages Grouped by Interface
1.2.1 Client<->RUIS
1.2.1.1 Message −1: Client→RUIS: POST (client info); response (UI, URIs)
This message is out of scope for this document
1.2.2 Client<->SRM
1.2.2.1 Message 0: Client→SRM: join new program stream, leave old program stream
This message is not explicitly detailed in this document. Without loss of generality, it is shown as originating in the client and terminating in the SRM. An alternative implementation would have this originate in the RUIS (triggered off of a client exchange with the RUIS) and terminate in the SRM.
1.2.3 SRM<->eMG
1.2.3.1 Message 1: SRM→eMG: Add-Session for active client
Explicit instruction from SRM to eMG that there is an active client behind the eMG that is requesting this stream. The eMG action is to join and begin caching the stream if it is able (leaving pre-emptively joined streams if need be), or reject the request.
1.2.3.1.1 Message Syntax:
HTTP 1.1 POST/addSession?parameters
Valid Responses:
200 OK—the eMG has added the session
503 Service Unavailable—the eMG is unable to add the session due to resource limitations (either internal or home network)

1.2.3.1.2 Message Semantics:
Verbose Version
  Stream ID=unique (in the context of the SRM and its subtending bonding groups) ID for this stream
  MURI=Multicast Group Address and UDP port for FCAST (consider using a well known port #?)
  Multicast Source Address (optional) for source specific multicast join
  Content-Root=HTTP content server in the headend where the stream can be retrieved via unicast (proxy) request. Utilized differently by eMG depending on proxy-cache model.
  Stream bitrate=mean bitrate of the stream. Could be used by eMG to reject a stream that exceeds what the home network bandwidth or eMG resources can support.
  Client ID (IP address or token)=Identifies client that has requested the stream. If the eMG needs to do access control for streams, this would be needed. This is a placeholder to allow the eMG to perform client authorization/entitlement. This is not intended to solve the general content protection problem (which will be solved via DRM), but may be needed for parental control functions and/or related to DTCP-IP link protection.
  Session ID (globally unique for the tuple: client, stream, creation event instance)=Identifies a particular session; used for reference purposes in other messages on this interface (remove session)*.
  Content Description—provides additional information about the content (e.g. pay-per-view, premium, subscription tier) to allow eMG to make decisions about preemptively joining a stream.
Terse Version
  Stream ID=unique (in the context of the SRM and its subtending bonding groups) ID for this stream. The stream ID references a stream element listed in the "catalog".
  Session ID (globally unique for the tuple: client, stream, creation event instance)=Identifies a particular session; used for reference purposes in other messages on this interface (remove session)*.
  Client ID (IP address or token)=Identifies client that has requested the stream. If the eMG needs to do access control for streams, this would be needed. This is a placeholder to allow the eMG to perform client authorization/entitlement. This is not intended to solve the general content protection problem (which will be solved via DRM), but may be needed for parental control functions and/or related to DTCP-IP link protection.
*Session ID is generated by the SRM based upon a "Message 0" request by a client for a particular stream. In the case where Message 0 requests multiple streams (e.g. to render a mosaic), the SRM would assign a unique Session ID for each different stream in the request. In the further case where Message 0 requests multiple copies of the same stream, the SRM could assign each copy the same Session ID or it could assign each copy a unique session ID.

1.2.3.2 Message 4: eMG→SRM: Inactivity timeout, remove session.
For an FCAST session that has explicitly been "Added" to the eMG by the SRM, if the client has not requested the content for some period of time (possibly configurable) the eMG sends a request message to the SRM informing it that the client has apparently gone away and requesting that the session be torn down. The SRM responds with a 200 OK indicating that teardown is to be performed for the session. If there is another client behind the eMG that is tuned to the same stream, the stream itself will not be torn down.

1.2.3.2.1 Message Syntax
HTTP/1.1 POST/removeSession?parameters
Valid Responses:
200 OK—the session has been removed by the SRM
1.2.3.2.2 Message Semantics
  Session identification
  Timestamp of last client request
1.2.3.3 Message 6: SRM→eMG: remove Session for active client
In response to a client action (such as a channel change, or other termination of the session), the SRM will signal a session termination to the eMG. The eMG action is to delete the session state, and then (likely) move the stream into a pre-emptively joined state.
1.2.3.3.1 Message Syntax
HTTP/1.1 POST/removeSession?parameters
Valid Responses:
200 OK—the session has been removed by the eMG
1.2.3.3.2 Message Semantics
  Session identification
1.2.4 SRM<->CMTS
1.2.4.1 Message 2: SRM→CMTS: PCMM Gate-Set (AMID, SubscriberID, GateSpec, Classifier, TrafficProfile)
Multicast gate-set indicating the multicast group and the "client". In this context, the client refers to the recipient of the multicast stream, i.e. the eMG. A single eMG could potentially have multiple clients, and thus multiple clients behind a single eMG could be viewing the same stream (each with its own session). As a result, a PCMM gate does not correspond 1:1 with a session. The correspondence is 1 gate: N sessions. The SRM will need to handle the mapping of sessions to gates and issue gate-set and gate-delete events as appropriate.
  The Gate-Set message will need to contain the "Stream ID" that the CMTS can use to populate its Advertisement messages. The CMTS will send the "Stream ID" in the Advertisement message for every stream that is currently provisioned via PCMM QoS on that particular bonding group. As of this writing, the current revision of the PacketCable Multimedia Specification (PKT-SP-MM-I05-091029) does not include the "Stream ID" parameter. This will require an ECR for inclusion in future releases.
1.2.4.2 Message 5: SRM→CMTS: PCMM Gate-delete
See PCMM Gate-Set, above.
1.2.5 CMTS<->eMG
Message 3: Multicast CMTS→Bonding Group: periodic advertisement of FCASTs actively being routed to the bonding group. This message is used by the eMG to pre-emptively join multicast sessions.
This message is described in detail in section 1.5.
1.3 Detailed semantics based on proxy-cache architectures
Four potential gateway proxy-cache architectures identified, options 1 & 3 seem the most attractive
1.3.1 Option 1) "Transparent" Forward Proxy
0   response=302   redirect:   //a.b.c.d/Apple/channel2/ipad.m3u8
1=Add Session (content-root=a.b.c.d)
FCAST Content-Location=/Apple/channel2/file.ts
eMG Storage=cached based on content-root & Content-Location
cache miss=//a.b.c.d/Apple/channel2/file.ts
1.3.2 Option 2) Reverse Proxy 1 (our current implementation)
content-root is a configured parameter on the eMG (it could point to a head-end reverse proxy if needed).
0 response=302 redirect: Location=gateway.mso.tv/Apple/channel2/ipad.m3u8
1=Add Session (no content root provided)
FCAST Content-Location=/Apple/channel2/file.ts eMG Storage=/var/www/Apple/channel2/file.ts
cache miss=//a.b.c.d/Apple/channel2/file.ts
This implementation suffers from an issue in which two FCASTs could write into the same filesystem directory, since the eMG storage is based solely on concatenating the local doc-root and the FCAST Content-Location. This seems risky.
1.3.3 Option 3) Reverse Proxy 2
client redirected to URI that contains token generated from content-root
0 response=302 redirect: Location=gateway.mso.tv/a_b_c_d/Apple/channel2/ipad.m3u8
1=Add Session (content-root=a.b.c.d)
FCAST Content-Location=/Apple/channel2/file.ts
eMG Storage=/var/www/a_b_c_d/Apple/channel2/file.ts
cache miss=//a.b.c.d/Apple/channel2/file.ts
1.3.4 Option 4) Forward Proxy
client redirected to local proxy
0 response=305 redirect: proxy=gateway.mso.tv
1=Add Session (content-root=a.b.c.d)
FCAST Content-Location=/Apple/channel2/file.ts
eMG Storage=unspecified, cache uses content-root and URI to index content
cache miss=//a.b.c.d/Apple/channel2/file.ts
how do the relative paths in the m3u8 get resolved? Do they resolve to the content-root or to the proxy?

1.4 Use Cases and Control Flows

The control flows for a number of use cases have been sketched out in the following sections. The initial pass attempted to minimize transaction time by running several message exchanges in parallel. In subsequent discussion, it was decided that it may be unnecessary to take such an approach, and that a serialized control flow may be sufficient, and would be simpler to implement. Further the serialized approach avoids the scenario in which the client is directed to the content stream and subsequently the SRM discovers that there is no bandwidth to deliver the stream.

The control flows focus on the SRM, CMTS & eMG interaction and so do not explicitly show any client actions that may have precipitated the use case.

1.5 Advertisement Message

During the development of the sequence diagrams for use case 5, the team realized that further investigations were needed to understand the semantics of the Advertisement message. The basic concept of the message is to convey to each of the Gateways on the same bonding group the streams currently available for the eMG to preemptively begin caching. Some assumptions are:
  The eMG may not have the desire (or the ability) to join all active streams on the BG
  Reasonably frequent (e.g. every ~2 seconds) state updates are desired.
  The details of a stream are unlikely to change very frequently (i.e. changes occur on a scale of hours/days rather than seconds).

The team explored four options, and settled on the fourth as being the most attractive.
Options Considered:
  1. All details of a stream conveyed in the message.
  2. Part of the stream information is sent as an offset to information configured on the eMG.
  3. Minimal details conveyed in the message, the remainder configured on the eMG.
  4. Active Stream IDs conveyed in the message, detailed information provided via FCASTed "catalog"

1.5.1 Option 4—Active Stream IDs conveyed in the message

In this option, a "catalog" file containing the details of all of the linear streams available on the network is pushed periodically via an FCAST session. The catalog contains, for each stream:
  Stream ID=unique (in the context of the SRM and its subtending bonding groups) ID for this stream
  MURI=Multicast Group Address and UDP port for FCAST (consider using a well known port #?)
  Multicast Source Address (optional) for source specific multicast join
  Content-Root=HTTP content server in the headend where the stream can be retrieved via unicast (proxy) request. Utilized differently by eMG depending on proxy-cache model.
  Stream bitrate=mean bitrate of the stream. Could be used by eMG to reject a stream that exceeds what the home network bandwidth or eMG resources can support.
  Content Description—provides additional information about the content (e.g. pay-per-view, premium, subscription tier) to allow eMG to make decisions about preemptively joining a stream.

1.5.1.1 Advertisement message syntax

The advertisement message then references Stream IDs. For simplicity it is desired that the advertisement fit into one MTU, so a terse representation of the stream IDs is needed. Some options to consider:
  A. List of Stream IDs. Assuming that Stream IDs are 16 bits, this results in a maximum of ~700 active streams (in the most compact representation) that can be simultaneously advertised for the bonding group. Active streams in excess of 700 on a single bonding group could be supported by the system, however they would be unavailable for pre-emptive caching. This may not pose any practical limitation, since it is likely that in the case where there are more than 700 active streams on the BG, a significant number of them are unlikely to benefit from pre-emptive caching anyway.
  B. Bitmap of Stream IDs. The message is formatted as a bitmap of Stream IDs (1 indicating active, 0 indicating inactive). This results in a maximum of ~11200 streams that can be described by the advertisement. Streams in excess of that number could be supported by the network, but would be unavailable for pre-emptive caching. Frankly, if there are more than 11200 streams available, it seems as though there would be a significant number for which pre-emptive caching would provide little benefit (e.g. long tail content).

After some discussion, the team prefers option A due to the fact that it allows the advertisement message to be very compact in the likely scenario where there is a large catalog of available streams and a small subset actively being delivered.

1.5.1.2 Impact on control plane semantics

Assuming that this approach is chosen, the catalog could be leveraged to lighten the protocol communication for session management. The SRM could use the "terse" encoding described in section 1.2.3.1. In this case, it may be desired (depending on the frequency with which the catalog is FCASTed) to have a startup sequence in which the eMG attempts to download the current catalog via HTTP GET (and upon failure, waits for the FCASTed version).

1.5.2 Other alternatives considered for advertisement messages
Assumptions:
1. The content root should be the first element after the header in a message.
2. The content root can have more than one stream.
3. The order of stream details can appear in any order.
4. IP addresses can be either IPv4 or IPv6.

5. Syntax doesn't have to be explicitly legible when viewed on the network, e.g. it doesn't have to be string based.
6. Syntax should not be so terse that a special tool is necessary to interpret information, e.g. we shouldn't use ASN.1 or some similar encoding.
7. Syntax is constrained to a byte boundary, i.e. all fields must use at least one complete byte.
8. Syntax does not have to be constrained to a word boundary.

1.5.2.1 Option 1—All details of a stream conveyed in the message

In this option all of the details are conveyed in the semantics of the Advertisement message explicitly. The details after the content root can appear in any order and are indicated by an attribute code.

Figure 3:
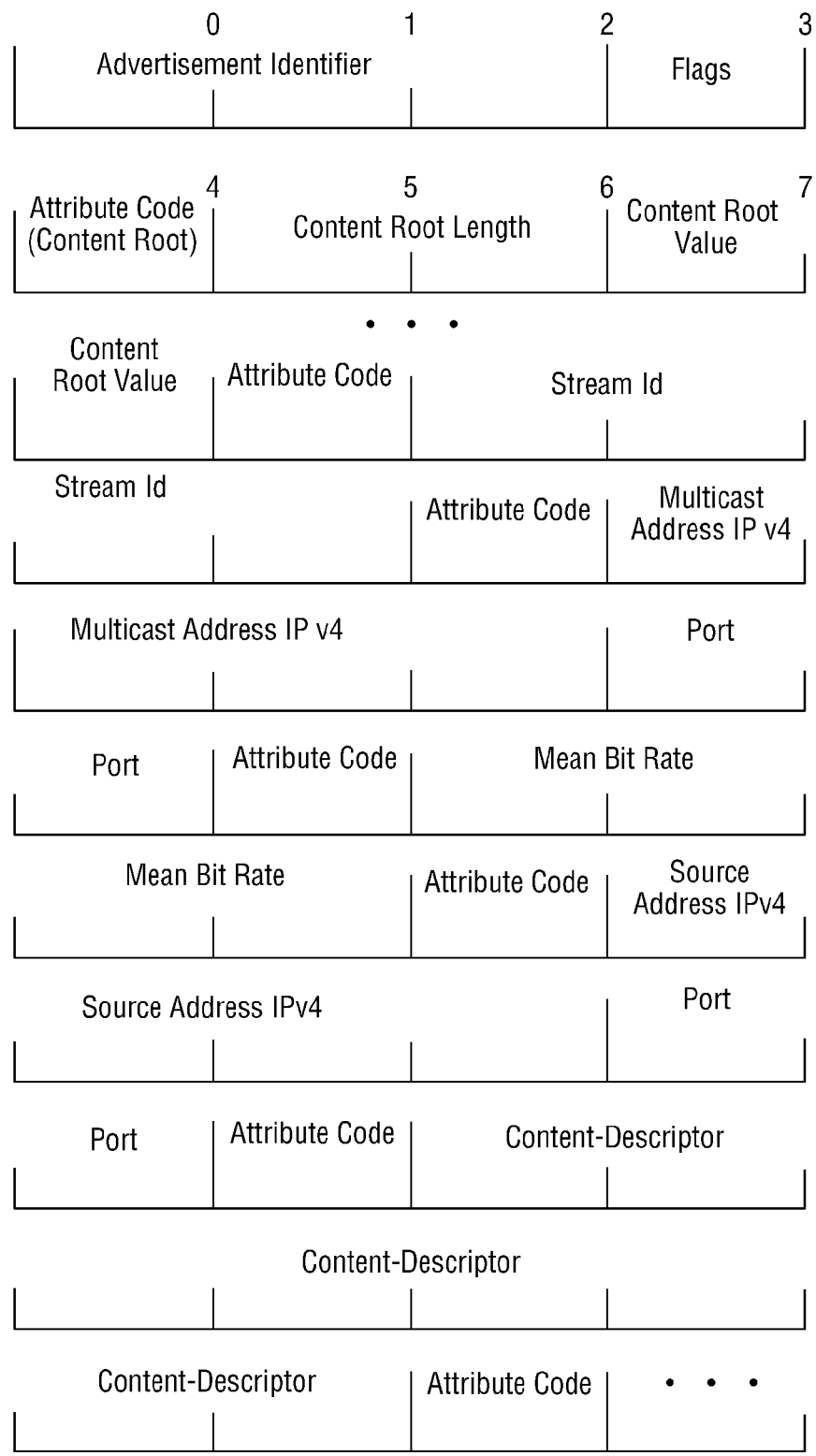
FIGS. 3-4 illustrate message formats as contemplated by one non-limiting aspect of the present invention.

An example format of the message is shown in FIG. 3 were each block represents a single byte:

Using this formatting, we attempted to extrapolate the number of streams that can be conveyed in a single message and the number of messages necessary to convey the details of 500 streams in a single bonding group.

Assumptions:
1. The MTU size for a packet is 1500 bytes.
2. Each packet is limited to 1350 bytes or less.
3. All data related to a stream is contained within the same packet.
4. The content root is 32 bytes in length.

Estimate 1: The network is configured so that each content root has one stream and all servers are using an IPv4 address.
Estimate 2: The network is configured so that each content root has six streams and all servers are using an IPv4 address.
Estimate 3: The network is configured so that each content root has one stream and all servers are using an IPv6 address.
Estimate 4: The network is configured so that each content root has six streams and all servers are using an IPv6 address.

The table below shows the values we derived for each item using the syntax for each estimate.

| Option 1 | Bytes per Stream | Streams per Packet | Packets for 500 Streams |
|---|---|---|---|
| Estimate 1 | 66 | 20 | 25 |
| Estimate 2 | 231 | 30 | 17 |
| Estimate 3 | 90 | 14 | 36 |
| Estimate 4 | 365 | 18 | 28 |

Figure 4:
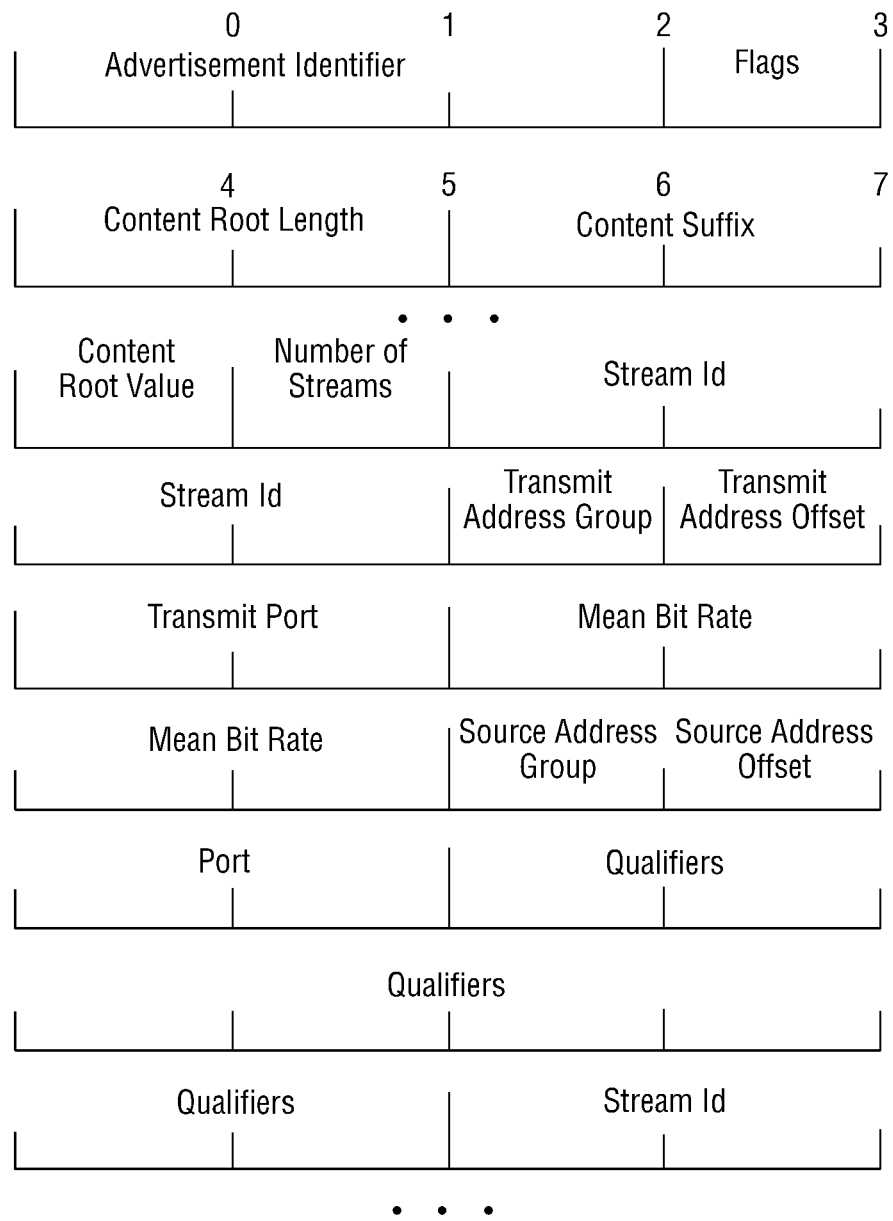

1.5.2.2 Option 2—Part of the stream information is sent as an offset to information configured on the eMG This option uses the concept that the eMG is configured with some knowledge of the network topology, the addresses used for multicasting the content is predefined, and that the content root is similar across all of the content servers. This allows the semantics of the message body to refer to an address as offsets to some predefined table of addresses instead of conveying the entire IP address in the message. The format assumes that the network could support up to 256 groups of address and allow 256 addresses within each group. In addition, the information in the message is in a fixed format, as show in FIG. 4.

An example format of the message might appear as the following:

Using the same Examples from Option 1 and excluding the delivery of the configuration information we estimate the following packet information for this formatting.

| Option 2 | Bytes per Stream | Streams per Packet | Packets for 500 Streams |
|---|---|---|---|
| Estimate 1 | 27 | 48 | 11 |
| Estimate 2 | 147 | 48 | 11 |
| Estimate 3 | 27 | 48 | 11 |
| Estimate 4 | 147 | 48 | 11 |

1.5.2.3 Option 3—Minimal details conveyed in the message, the remainder configured on the eMG The last option contemplated is when the entire network information, called a catalog, is obtained initially during configuration of the eMG. The Advertisement then simply uses some number of bytes, to be determined, included as an identifier for the message and the remainder of the message 1000+ bytes defines the status, on or off, for each stream entry in the catalog that is currently available on the bonding group. This scenario assumes that most of the network remains static and could be updated during non-peak hours as needed.

The advantage to this option is that all of the information about the available streams can be sent in a single packet vs. numerous packets for the other options. A disadvantage is that the CMTS may need to correlate the streams to the binary information it is sending so that it can populate the Advertisement message.

1.5.2.4 Option 1 vs. Option 3

Summarizing these two options in a side-by-side comparison results in the following observations:

| | |
|---|---|
| Periodic "full" info | Full Catalog with Periodic State |
| ~60 bytes/active Stream | Full Catalog - |
| ~25 streams/packet | ~60 bytes/active stream |
| ~20 packets for 500 streams | ~60 Kbytes to convey 1000 stms |
| 30 Kbytes to convey all stream information | ~Refresh 1-2/day |
| Refresh Rate ~1-5 mins. | Periodic State - |
| Rule to handle packet loss | 1 packet for state of 1000 strms |
| Could be constant packet rate | |

2 Syntax of Catalog Messages

The catalog message describes all of the content available on the network for a gateway. It provides details necessary for an eMG to join a multicast group in advance of a client requesting the content from a network. It also provides set of rules for the eMG to apply when to evaluating whether to preemptively join multicast group or not.

The catalog message is sent periodically using a reliable multicast transport on a provisioned group address and port that the eMG opens upon initiation. The eMG processes the message, retain the information for future use as all communication afterwards uses an identifier to communicate commands operations that the eMG will need to perform. FIG. 5 illustrates a sequence diagram for the Catalog message.

2.1 Catalog Message

The details of the catalog message are defined below along with a brief description of each data element:

A "catalog" contains a version number plus an array of stream objects. Each stream object contains:
  stream ID—a unique identifier (channel number or channel name) for the linear content
  group address (either ipv4 or ipv6)—the multicast address the to use to receive stream
  port number—the multicast port to use to receive the stream
  source address (optional, either ipv4 or ipv6)—the streaming server's IP address
  stream bitrate—the mean bitrate for the stream content description—provides additional information about the content (e.g. pay-per-view, premium, subscription tier) to allow eMG to make decisions about preemptively joining a stream 2.1.1 Content description "Content description" is any information that the asset management system or OSS wishes to convey to the individual gateways to help them make decisions as to whether to preemptively join a particular stream.

"Content description" could include any or all of the following:

stream metadata (bitrate, resolution, encoder, codec, profile, level, languages, subtitles, CC)

channel metadata (call sign, genre, keywords, parental guidelines, rating (popularity))

preposition metadata (force, best effort, never, time of day)

For the initial implementation, "content description" is defined as a Boolean indicating whether the gateway should attempt to cache the associated stream. In the future, this can be expanded to contain either a string or else a JSON object encoding of other possible "content description" metadata, while maintaining backwards-compatibility with implementations that continue to pass this as a Boolean.

2.1.2 Catalog Encoding

The stream catalog should be human-readable and use UTF-8 character encoding to accommodate difference language types. Below is an example of the formatting using a JSON object encoding.

```
{
"version" : 1,
"streams" :
[
    {
        "streamID" : 123,
        "group_addr" : "230.250.250.12",
        "port" : 40001,
        "src_addr" : "10.253.0.3",
        "content-root" : "http://emg.mso.tv/channel2/stream1",
        "stream_bitrate" : 3000000,
        "preemption_hint" : true
    },
    {
        "streamID" : 456,
        "group_addr_v6" : "FF0X:0:0:0:0:0:0:110",
        "port" : 40002,
        "src_addr_v6" : "fe80::6233:4bff:fe07:cd53",
        "content-root" : "http://emg.mso.tv/channel1/stream2",
        "stream_bitrate" : 3000000,
        "preemption_hint" : false
    }
]
}
```

3 Syntax of Advertisement Messages 3.1 Advertisement Syntax

The CMTS Advertisement message will convey the set of all streams that are currently provisioned with PCCM QoS via a PCMM-Gate-Set, for a particular bonding group. It also includes a reference to the specific URI and version of the catalog that this message pertains to.

3.2 Advertisement Encoding

The advertisement message is encapsulated in a single UDP datagram, sized to be transmittable within a single MTU (assumed to be 1500 bytes, including UDP header) to avoid IP fragmentation. The advertisement message uses binary encoding; multi-byte integers are passed in network byte order (big-endian, most significant byte first).

char catalog_uri[256];
uint16 catalog_version;
uint16 nStreams;
uint16 array[nStreams];

One non-limiting aspect of the present invention contemplates a reliable multicast file transport for available linear content on an IP network to a gateway using the FCAST protocol, a file-casting method.

One non-limiting aspect of the present invention contemplates semantics and methodologies for delivering information about multicast content available for consumption on a network using, a reliable multicast file transport. This information is referred to as the "catalog". The concept of using a reliable multicast file transport to deliver the information across the access network is unique and is hereafter referred to as the 'catalog' method. The Session Resource Manager (SRM) periodically broadcasts the current catalog file via a reliable multicast file transport. The information contained in the file describes the set of linear content streams available on the network, along with the IP multicast group address and other information necessary to receive them. The details for the file are defined in Section 2 of the document in Appendix A. Upon initiation, a gateway will join a pre-provisioned multicast group on which the catalog file is periodically transmitted. This allows a gateway to join the appropriate multicast group when a client requests content that is available in the catalog.

One non-limiting aspect of the present invention contemplates providing a reliable and scalable mechanism of delivering a catalog of available multicast content streams for the purpose of allowing a gateway to join the appropriate IP multicast group to receive a particular content stream.

One non-limiting aspect of the present invention contemplates efficiencies in downstream bandwidth utilization through the 'catalog' method by applying a reliable multicast protocol for delivering the catalog file, especially in situations such as power outages (where gateways are attempting to establish network connectivity at virtually the same time), or providing updates to the catalog. In this approach a single copy of the catalog is transmitted to all of the gateways simultaneously.

One non-limiting aspect of the present invention contemplates efficiencies in the upstream bandwidth also occur in the 'catalog' method as the only information sent from the gateway to the server about the progress and status of the file transfer happens when a portion of the file fails to arrive. This differs from a reliable unicast transport protocol such as TCP, which provides continuous acknowledgements regarding the progress of the packets that are received.

One non-limiting aspect of the present invention contemplates the 'catalog' method solving the process of delivering updates or changes of the catalog file to the gateways. The methodology employed in this process is that it simply sends the new catalog file over the same reliable multicast stream.

One non-limiting aspect of the present invention contemplates a resource manager and for the resource manager to cause the associated gateway to join the requested IP multicast stream.

One non-limiting aspect of the present invention contemplates creating a protocol to allow a client to request and receive access to a linear content stream via a server, called a Session Resource Manager (SRM), and for the SRM to trigger the associated gateway to join the appropriate IP multicast group in order to deliver the content to the client. Its purpose is to support the authentication, authorization, control and management of the multicast content streams for delivery by a gateway. This technology utilizes the common HTTP protocol as its foundation. It defines the web service semantics between a client, the SRM, and the gateway. It further defines the operations necessary for removing an existing multicast content stream or changing to a new multicast content stream. In addition, it allows the SRM to control in real-time whether each linear content stream is delivered using multicast versus unicast on the access network. Sections 1 through 1.4.4 of Appendix A provide a set of sequence diagrams illustrating the message exchange between the client, SRM and gateway to gain access to the multicast content streams.

One non-limiting aspect of the present invention contemplates a protocol that allows a trusted network element (the SRM) to validate a client's request for a linear content stream, and only if the client is authorized, cause the associated gateway to join the IP multicast content stream. In addition, this allows the SRM to maintain state information about the clients and gateways that are actively using each multicast content stream. This information can help in the reclamation of bandwidth used by multicast streams that are no longer actively being viewed.

One non-limiting aspect of the present invention contemplates the authentication of a gateway is completed by the SRM. The SRM has the opportunity to validate a channel request from a client prior to any network resources being dedicated to the delivery of the requested content. Validation can include client/subscriber authentication, authorization based upon subscription and/or parental control settings, access network resource availability, etc. The SRM method leverages the flexibility and proliferation of the HTTP protocol to provide the communication foundation for its control protocol.

One non-limiting aspect of the present invention contemplates extending the PCMM protocol to provide multicast group routing control, resource admission control and quality of service within the DOCSIS access network for IP multicast streams by a resource manager to a gateway or similar customer premise device.

One non-limiting aspect of the present invention contemplates using PCMM to allow a Session Resource Manager (SRM) to create and delete IPTV multicast sessions on the CMTS in a manner that allows the CMTS to differentiate between active joiners and passive (preemptive) joiners. The IGMP protocol is utilized between each gateway (both active and passive) and the CMTS to enable multicast forwarding. For active joiners, the SRM uses the Gate-Set request and response messages of the PCMM architecture to validate resource availability, signal traffic parameters and priority for the stream. Thus the Gate-Set messaging is utilized for each active group member (i.e. clients that are consuming the stream), whereas gateway devices that preemptively join the multicast group only utilize the IGMP mechanism, and so do not have an associated Gate. The result is that multicast sessions that have active group members have guaranteed resources and an established traffic priority, whereas multicast sessions that only have passive group members do not, and can be torn down by the CMTS to free up resources. Sections 1 through 1.4.4 of Appendix A provide a set of sequence diagrams illustrating the message exchange between the SRM and the CMTS to perform these operations using PCMM.

One non-limiting aspect of the present invention contemplates ensuring the quality of service for the delivery of multicast content streams being transported through the CMTS and gateway to active clients. Further, it provides a mechanism for the CMTS to manage the IP multicast bandwidth by identifying those streams that are actively being used versus those that are joined passively.

One non-limiting aspect of the present invention contemplates managing active versus preemptive multicast streams.

One non-limiting aspect of the present invention contemplates defining a process for providing a quality of service for the IP multicast streams, which allows the network to guarantee resources for multicast streams. Thus, delivering an improved user's experience compared to a best effort service. In addition, this methodology provides the CMTS with information about actively joined streams, including resource requirements. For these streams, the CMTS performs resource admission control (i.e. to validate that sufficient bandwidth is available on the bonding group), and provides assurance that the streams are delivered according the resource request. For streams that are only joined passively, no admission control nor delivery assurances are provided by the CMTS. The CMTS is the only entity in the network that has all of the necessary information to perform this functionality. This approach is the most efficient from a complexity perspective.

One non-limiting aspect of the present invention contemplates advertisement of multicast content currently present on the access network connection. This may include providing a mechanism to notify a gateway or similar customer premises device (CPE) with information about the IP multicast video content that is currently being transmitted on the gateway's access network service group.

One non-limiting aspect of the present invention contemplates allowing a gateway to "preemptively" join multicast groups that are already being delivered on the access network service group (e.g. bonding group). Preemptively joining content prior to a client requesting it allows the gateway to cache a portion of the content which can then be used to improve channel change performance. This "preemptively" method allows the decision process for determining what content to preemptively join to occur within the gateway or in the SRM. It requires some additional functionality within the CMTS. The approach introduces a new message called the Advertise message sent by the CMTS to convey the set of multicast streams that are currently being delivered on the bonding group. In addition the "preemptively" method introduces the concept of attributes that could be passed by the server via the 'catalog' method. The gateway could apply these rules during its decision processing when determining to preemptive join a multicast content stream. Furthermore, the Advertise message could contain additional information that is scoped to the current bonding group that could facilitate the gateway's decision processing. This additional information could include, for example, a count of current active viewers in order to provide a real-time indication of each stream's popularity. Section 1.4.5 of Appendix A shows a sequence diagram for the message exchange for the Advertise message. Section 1.5 explores four alternative approaches that could be employed to deliver the advertisement information. One of these approaches, labeled option 4, takes advantage of the 'catalog' method in order to minimize the bandwidth necessary to convey the information. Section 3 provides a proposed format for the semantics of the message in this case.

One non-limiting aspect of the present invention contemplates improving bandwidth efficiencies as compared to retrieving the content at the time of a client's request. It can also accelerate channel change operations and thereby improve the user experience.

The methodology applied in "preemptively" may operate as follows. Firstly, the CMTS generates the Advertise message regarding the current multicast content streams available on the bonding group. The CMTS already maintains this information internally to route the multicast content from the NSI to the DOCSIS network to deliver multicast content.

Secondly, in the "preemptively" method the CMTS can simply transmit a unique message on each bonding group, which automatically isolates the transmission of the advertisement information to only those gateways that the information pertains. Another advantage with the "preemptively" method is that it delivers the Advertisement message using multicast as opposed to unicast. This significantly reduces bandwidth on the access network. Furthermore since the Advertisement message is generated internally within the CMTS, no NSI network bandwidth is required. The "preemptively" method further improves bandwidth efficiency via the formatting applied to the information being transmitted. By leveraging the contents of the Catalog message, the "preemptively" method can convey the information for approximately 700 multicast content streams and still remain within a single IP packet. The last improvement of the "preemptively" method comes from the ability to include attributes within the data of the Catalog file and/or the Advertise message. The server can insert these attributes in the content description field for each content stream in the Catalog, or encode them along with the list of current multicast streams in the Advertise. The gateway can then utilize these attributes when determining which content streams to preemptively join, rather than simply having all gateways join the same set of content streams. As an example, the algorithm on the gateway could state that it should not preemptively join any premium channel content as the subscriber doesn't have any subscription for those types of content streams. The content description field for a channel could indicate that a specific multicast content stream is a premium channel. The gateway could then use this information to conclude that the gateway should not preemptively join that specific content stream. As mentioned previously, another application of these attributes would be to signal information about the current popularity of each stream, so that the gateway could preemptively join the more popular programs. The gateway can utilize these attributes along with its own internal knowledge of historical viewing patterns for the subscriber. Each of these increases the likelihood that the gateway will preemptively join the streams that are the most relevant to the subscriber, thereby increasing the chances of improving channel change performance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A multicast system comprising:
a sourcing device configured to source content within multicast streams to at least one multicast service group;
a plurality of gateways configured to process the multicast streams for output to one or more clients, the gateways configured to actively and preemptively join the multicast streams, the actively join characterized by a corresponding client interfacing a corresponding one or more of the multicast streams with a user and the preemptively join characterized by a corresponding client caching a corresponding one or more of the multicast streams without interfacing the cached one more multicast streams to the user; and
a manager configured to manage the multicast streams sourced from the sourcing device to the gateways, the manager configured to facilitate:

i) at a first instance in time:
(1) determining each of the multicast streams being actively joined by one or more of the gateways;
(2) maintaining each of the actively joined multicast streams such that the sourcing device continues sourcing each of the corresponding multicast streams at least until a second instance in time occurring after the first instance;
(3) determining each of the multicast streams being preemptively joined by one or more of the gateways;
(4) deconstructing each of the preemptively joined multicast streams not actively joined by at least one of the gateways such that the sourcing device ceases sourcing each of the corresponding multicast streams at least until the second instance; and
(5) maintaining each of the preemptively joined multicast streams actively joined by at least one of the gateways such that the sourcing device continues sourcing each of the corresponding multicast streams at least until the second instance.

2. The multicast system of claim 1 wherein:
the manager is configured to facilitate transmission of a catalog to each of the multicast service groups at a third instance in time occurring prior to the first instance, the catalog identifying all multicast streams available for sourcing from the source device except for the multicast streams already being actively joined at the third instance;
the manager is configured to facilitate transmission of advertisements to each of the multicast service groups at the third instance, each advertisement identifying all multicast streams actively joined by at least one gateway within the corresponding multicast service group at the third instance;
the gateways are configured to select the multicast streams to be actively joined from the advertisement or the catalog, thereby enabling the gateways to select multicast streams already in progress from the advertisement and to select multicast streams not already in progress from the catalog; and
the gateways are configured to select the multicast streams to be preemptively joined from the advertisement and not the catalog, thereby limiting the preemptively joined multicast streams to the multicast streams identified in the advertisement.

3. The multicast system of claim 1 wherein:
the gateways are configured to transmit status messages to the manager at a fourth instance in time occurring prior to the first instance for indicating each multicast stream actively joined and each multicast stream preemptively joined at the fourth instance; and
the manager is configured to facilitate determining the actively and preemptively joined multicast streams at the first instance based on analysis of information included in the status messages.

4. A method of facilitating changing multicast streams used to carry on-demand linear content over Internet Protocol (IP) comprising:
directing a multicast source at a first instance in time to multicast a plurality of multicast streams to a multicast service group;
determining at a second instance in time occurring after the first instance one or more of the plurality of multicast streams to be active streams, the active streams determined to be actively tuned by at least one member of the multicast group for output to a corresponding client;
determining at the second instance one or more of the plurality of multicast streams to be preemptive streams, the preemptive streams determined to be cached by at least one member of the multicast group without being contemporaneously output to a corresponding client;

directing the multicast source at a third instance in time occurring after the second instance to cease multicast of each preemptive stream other than at least one or more of the preemptive streams also determined to be one of the active streams;

directing the multicast source at the third instance to continue multicast of each active stream;

transmitting a catalog to the multicast service group listing multicast streams available from the multicast source, the catalog listing at least each of the active and preemptive streams; and transmitting an advertisement to the multicast service group listing the active streams and not the preemptive streams.

5. The method of claim 4 further comprising determining the multicast streams to be active streams and preemptive streams according to information included within status messages transmitted from clients within the multicast service group, the status messages identifying each active and preemptive stream joined by the corresponding client.

6. The method of claim 4 further comprising:
transmitting the catalog to the clients at a fourth instance in time occurring prior to the first instance;
receiving stream selection messages from the clients indicating a request from a corresponding one of the clients to actively join one of the multicast streams listed in the catalog; and
directing the multicast source to multicast the plurality of multicast streams at the first instance according to the multicast streams identified in the stream selection messages.

7. The method of claim 6 further comprising transmitting the advertisement to the clients at the fourth instance, the advertisement excluding any multicast streams identified in the catalog that were not determined to be active streams.

8. A non-transitory computer-readable medium having a plurality of non-transitory instructions, which when executed with a processor of a manager, are sufficient to facilitate multicast streaming, the non-transitory instructions being sufficient for:
determining a sourcing device configured to source multicast streams to at least one multicast service group;
determining a plurality of gateways within the at least one multicast service group configured to process the multicast streams for output to one or more clients, the gateways configured to actively and preemptively join the multicast streams, the actively join characterized by a corresponding client interfacing a corresponding one or more of the multicast streams with a user and the preemptively join characterized by a corresponding client caching a corresponding one or more of the multicast streams without interfacing the cached one more multicast streams to the user; and
managing the multicast streams sourced from the sourcing device to the gateways, including at a first instance in time:
(1) determining each of the multicast streams being actively joined by one or more of the gateways;
(2) determining each of the multicast streams being preemptively joined by one or more of the gateways;
(3) maintaining each of the actively joined multicast streams such that the sourcing device continues sourcing each of the corresponding multicast streams at least until a second instance in time occurring after the first instance;
(4) deconstructing each of the preemptively joined multicast streams not actively joined by at least one of the gateways such that the sourcing device ceases sourcing each of the corresponding multicast streams at least until the second instance; and
(5) maintaining each of the preemptively joined multicast streams actively joined by at least one of the gateways such that the sourcing device continues sourcing each of the corresponding multicast streams at least until the second instance.

9. The non-transitory computer-readable medium of the claim 8 further comprising non-transitory instructions sufficient for transmitting a catalog of multicast streams to the at least one multicast service group, the catalog identifying multicast streams available on-demand.

10. The non-transitory computer-readable medium of the claim 9 further comprising non-transitory instructions sufficient for transmitting an advertisement of multicast streams to the at least one multicast service group, the advertisement identifying multicast streams being actively joined.

11. The non-transitory computer-readable medium of the claim 10 further comprising non-transitory instructions sufficient for determining at least one of the at least one multicast service group to correspond with multicast streams connected back to a common port of the source device such that each multicast stream identified with the advertisement is transmitted from the common port.

12. The non-transitory computer-readable medium of the claim 10 further comprising non-transitory instructions sufficient for determining at least one of the at least one multicast service group to correspond with multicast streams carried over a common frequency from the source device and limiting the multicast streams identified with the advertisement to the multicast streams being transmitted over the common frequency.

13. The non-transitory computer-readable medium of the claim 10 further comprising non-transitory instructions sufficient for excluding the multicast streams identified within the advertisement from the multicast streams identified within the catalog.

14. The non-transitory computer-readable medium of the claim 10 further comprising non-transitory instructions sufficient for including a totality of the multicast streams available on-demand within the catalog and multicasting the catalog to such that each of the plurality of gateways receives a single copy of the catalog.

15. The non-transitory computer-readable medium of the claim 8 further comprising non-transitory instructions sufficient for determining a most popular one of the multicast streams based on attributes transmitted from the source device.

16. The non-transitory computer-readable medium of the claim 8 further comprising non-transitory instructions sufficient for:
transmitting a catalog to each of the multicast service groups at a third instance in time occurring prior to the first instance, the catalog identifying all multicast streams available for sourcing from the source device except for the multicast streams already being actively joined at the third instance;
transmitting advertisements to each of the multicast service groups at the third instance, each advertisement identifying all multicast streams actively joined by at least one gateway within the corresponding multicast service group at the third instance;

instructing the gateways to select the multicast streams to be actively joined from the advertisement or the catalog, thereby enabling the gateways to select multicast streams already in progress from the advertisement and to select multicast streams not already in progress from the catalog; and instructing the gateways to select the multicast streams to be preemptively joined from the advertisement and not the catalog, thereby limiting the preemptively joined multicast streams to the multicast streams identified in the advertisement.

17. The non-transitory computer-readable medium of the claim 8 further comprising non-transitory instructions sufficient for:

processing status messages transmitted from the gateways to indicate each multicast stream actively joined and each multicast stream preemptively joined at a fourth instance occurring prior to the first instance; and determining the actively and preemptively joined multicast streams at the first instance based on analysis of information included in the status messages.

\* \* \* \* \*